United States Patent
Wang et al.

[19]

[11] Patent Number: 5,886,640
[45] Date of Patent: Mar. 23, 1999

[54] POWER MONITORING CIRCUIT FOR THE CENTRAL PROCESSING UNIT ON A COMPUTER CIRCUIT BOARD

[75] Inventors: Cheng-Chih Wang, Chupei; Angel Huang, Chutung Chen; Der-Shyun Huang, Chupei, all of Taiwan

[73] Assignee: Winbond Electronics Corp., Hsinchu, Taiwan

[21] Appl. No.: 977,538

[22] Filed: Nov. 25, 1997

[30] Foreign Application Priority Data

Oct. 9, 1997 [TW] Taiwan .................................. 86114838

[51] Int. Cl.$^6$ .................................................. G08B 21/00
[52] U.S. Cl. .......................... 340/635; 340/660; 340/661; 364/528.32; 364/528.33
[58] Field of Search .................................... 340/635, 636, 340/660, 661, 662, 663, 664; 324/72, 72.5; 323/274, 371; 364/528.21, 528.28, 528.33, 528.32

[56] References Cited

U.S. PATENT DOCUMENTS

| | | | |
|---|---|---|---|
| 3,577,064 | 5/1971 | Nercessian | 323/275 |
| 4,951,171 | 8/1990 | Tran et al. | 361/90 |
| 5,079,688 | 1/1992 | Kido | 363/125 |
| 5,525,913 | 6/1996 | Brooks et al. | 324/771 |

*Primary Examiner*—Jeffery A. Hofsass
*Assistant Examiner*—Ashok Mannava
*Attorney, Agent, or Firm*—Rabin & Champagne, P.C.

[57] ABSTRACT

A power monitoring circuit for monitoring the power being supplied to a central processing unit (CPU) is provided. This power monitoring circuit can adaptively adjust for a suitable power level corresponding to the power rating of the CPU. The CPU on which the power monitoring circuit is used should be of the type having a factory-preset built-in power-rating code that indicates the tolerable power range acceptable by the CPU. The power monitoring circuit includes decoding means that can decode the power-rating code into a bottom-limit reference value and an bottom-limit reference value which indicate respectively the bottom and upper limits of the tolerable power range acceptable by the CPU. Further, the power monitoring circuit includes means for comparing the magnitude of the power being supplied to the CPU against the bottom-limit reference value and the bottom-limit reference value to see if the power is within the tolerable power range acceptable by the CPU. If not, a power-fault signal is generated, which can be used by a power control circuit to perform a feedback control that adjusts the power being supplied to the CPU to within the tolerable power range acceptable by the CPU. If the power control circuit is unable to adjust the power to within the tolerable power range acceptable by the CPU, an audible alarm sound is generated to notify the user or any personnel nearby to take necessary repair actions.

10 Claims, 3 Drawing Sheets

POWER MONITORING CIRCUIT FOR THE CENTRAL PROCESSING UNIT ON A COMPUTER CIRCUIT BOARD

BACKGROUND OF THE INVENTION

1. Field of the Invention

This invention relates to power monitoring circuits, and more particularly, to a power monitoring circuit for the central processing unit (CPU) on a computer circuit board that can protect the CPU from being damaged or burned out due to the power being supplied to the CPU exceeding the power rating.

2. Description of Related Art

In this information age, computers are becoming an almost indispensable tool for all walks of life. Computers are useful for various applications, such as data processing, multimedia, database, data exchange networking, to name just a few. In a computer system, such as a personal computer (PC), the core element is the central processing unit (CPU). Should the CPU fails or is damaged due to any reasons, the whole computer system may become entirely inoperative. Moreover, the CPU is typically the most expensive integrated circuit (IC) device on a PC mother board. The replacement of a damaged CPU with a good one is therefore quite costly for the user. For these reasons, the CPU on a PC mother board is usually provided with various protective means to protect it from being damaged. One factor that can cause damage to the CPU is an overly large power that exceeds the upper limit of the tolerable power range acceptable by the CPU. To prevent this, the CPU is usually provided with power monitoring means that can constantly monitor the level of the power being supplied to the CPU and make necessary adjustments in the power level or generate an alarm when an abnormal condition in the power occurs.

FIG. 1 is a schematic block diagram showing the architecture of a first conventional power monitoring circuit for monitoring the power being supplied to a CPU 10. As shown, the power monitoring circuit includes an analog-to-digital (A/D) converter 20, a digital comparator 30, an alarm signal generator 40, and a loudspeaker 50.

The A/D converter 20 has an input end coupled to the power input line of the CPU 10 to take the power being supplied to the CPU as an input, and is capable of converting the input signal into a digital signal whose value represents the current level of the power being supplied to the CPU 10. The digital comparator 30 then receives the digital output from the A/D converter 20 and compares it with a preset upper-limit reference value (which represents the tolerable upper limit of the input power to the CPU 10) and a bottom-limit reference value (which represents the tolerable bottom limit of the input power to the CPU 10). These two reference values are preset into the digital comparator 30. If the output of the A/D converter 20 is between the bottom-limit reference value and the upper-limit reference value (indicating that the current input power to the CPU 10 is within the tolerable range), the digital comparator 30 will produce no signal at its output; otherwise, if the output of the A/D converter 20 is below the bottom-limit reference value or above the upper-limit reference value (indicating that the current input power to the CPU 10 is beyond the tolerable range), the digital comparator 30 will output a power-fault signal to the alarm signal generator 40, thus triggering the alarm signal generator 40 to produce an alarm signal which is then converted by the loudspeaker 50 into an audible alarm sound to inform the user or any personnel nearby to take any necessary repair actions.

One drawback to the foregoing power monitoring circuit, however, is that the bottom-limit reference value and upper-limit reference value are fixedly preset into the digital comparator 30. For other CPUs with different power ratings, the settings to the digital comparator 30 should be manually changed, which is quite laborious to do.

FIG. 2 shows a second conventional power monitoring circuit for monitoring the power being supplied to a CPU 10. As shown, this power monitoring circuit includes a power control circuit 60 for controlling the level of the power being supplied to the CPU 10. When the CPU 10 is switched on, it will send out a power-rating code via the signal line 15 to the power control circuit 60. This power-rating code indicates the tolerable range of power that can be accepted by the CPU 10 and can set the power control circuit 60 to adjust for and supply a corresponding level of power to the CPU 10.

The foregoing power monitoring circuit, however, has the drawback that, in the event that the power control circuit 60 fails, the CPU 10 can be damaged or burned out due to the power exceeding the tolerable range and which is unknown to the user.

Most of the computer mother boards are provided with setting means that allows the user to manually set for a suitable power rating for the CPU on the mother board. However, the setting procedure is typically laborious and requires an understanding of the computer hardware. In the event that the user mistakenly set a wrong rating, the CPU could be damaged. Newer models of CPUs are factory-preset with power-rating codes that allow the power monitoring means to automatically adjust for and supply a corresponding power level to the CPU. In user, the power being supplied to the CPU can be continuously monitored by the power monitoring means. In practice, however, the power monitoring means is typically implemented with software. Therefore, in the event that the CPU malfunctions due to inadequate or over power supply, the power monitoring means may fail to function properly due to the software therein being unable to be executed by the CPU. This can cause the CPU to be damaged or burned out.

SUMMARY OF THE INVENTION

It is therefore an objective of the present invention to provide a power monitoring circuit for a CPU having a factory-preset built-in power-rating code, which can adaptively adjust for a suitable power level corresponding to the power-rating code of the CPU.

It is another an objective of the present invention to provide a power monitoring circuit for a CPU having a factory-preset built-in power-rating code, which can perform the power monitoring function and generate an alarm signal even if the CPU is failed.

In accordance with the foregoing and other objectives of the present invention, a power monitoring circuit for a CPU is provided. The CPU should be of the type having a factory-preset built-in power-rating code that indicates the tolerable power range acceptable by the CPU. The power monitoring circuit of the invention includes decoding means that can decode the power-rating code into a bottom-limit reference value and an bottom-limit reference value which indicate respectively the bottom and upper limits of the tolerable power range acceptable by the CPU.

Further, the power monitoring circuit includes means for comparing the magnitude of the power being supplied to the CPU against the bottom-limit reference value and the bottom-limit reference value to see if the power is within the tolerable power range acceptable by the CPU. If not, a power-fault signal is generated, which can be used by a power control circuit to perform a feedback control that adjust the power being supplied to the CPU to within the tolerable power range acceptable by the CPU. If the power control circuit is unable to adjust the power to within the tolerable power range acceptable by the CPU, an audible alarm sound is generated to notify the user or any personnel nearby to take necessary repair actions.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Two preferred embodiments of the invention will be disclosed in the following, with reference to FIG. 3 and FIG. 4 respectively.

First Preferred Embodiment

Figure 1:
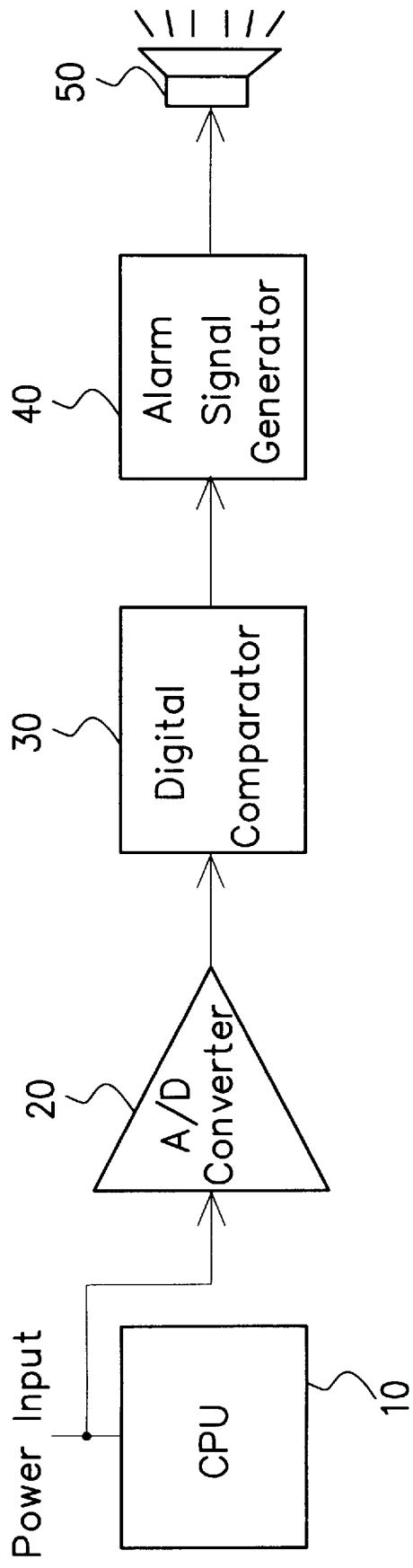
FIG. 1 is a schematic block diagram of a first conventional power monitoring circuit for monitoring the power being supplied to a CPU.
Figure 2:
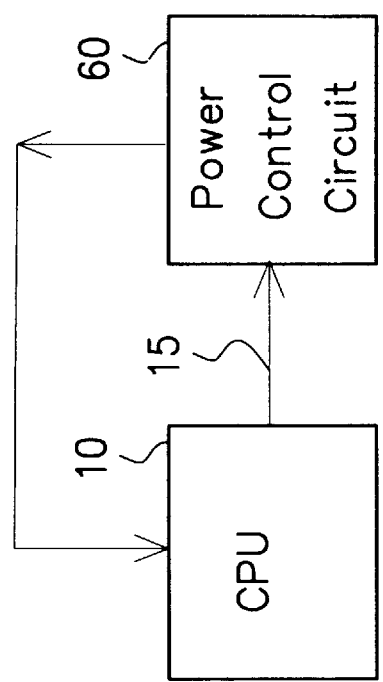
FIG. 2 is a schematic block diagram of a second conventional power monitoring circuit for monitoring the power being supplied to a CPU.
Figure 3:
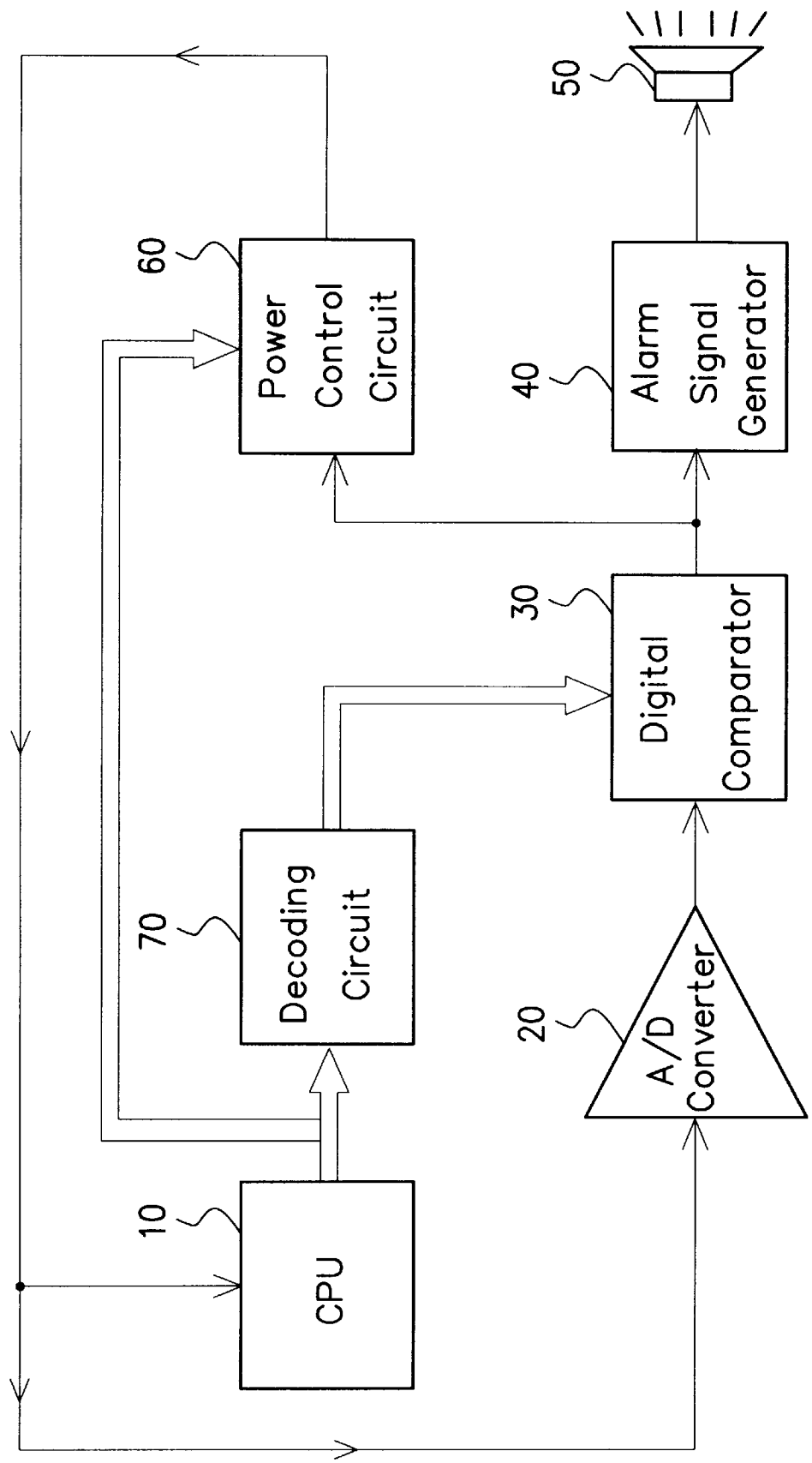
FIG. 3 is a schematic block diagram of a first preferred embodiment of the power monitoring circuit according to the invention for monitoring the power being supplied to a CPU.

FIG. 3 is a schematic block diagram showing the architecture of the first preferred embodiment of the power monitoring circuit according to the invention for monitoring the power being supplied to a CPU 10. As shown, the power monitoring circuit of this embodiment includes an analog-to-digital (A/D) converter 20, a digital comparator 30, an alarm signal generator 40, a loudspeaker 50, a power control circuit 60, and a decoding circuit 70.

In operation, the CPU 10 sends out its factory-preset built-in power-rating code to both of the decoding circuit 70 and the power control circuit 60. In response to this power-rating code, the power control circuit 60 outputs a corresponding power level to the CPU 10, while the decoding circuit 70 decodes the power-rating code into an upper-limit reference value corresponding to the upper limit of the tolerable power range acceptable by the CPU 10 and a bottom-limit reference value corresponding to the bottom limit of the same. These two reference values are then sent to the digital comparator 30 for the digital comparator 30 to compare its input with these two reference values.

The A/D converter 20 has an input end coupled to the power input line of the CPU 10 and is capable of producing a digital output whose value represents the current level of the power being supplied to the CPU 10. The digital comparator 30 then receives the digital output from the A/D converter 20 and compares it with the upper-limit reference value and the bottom-limit reference value which are received from the decoding circuit 70. If the value of the output of the A/D converter 20 is below the bottom-limit reference value or above the upper-limit reference value (which indicates that the current input power to the CPU 10 is out of the tolerable power range acceptable by the CPU 10), the digital comparator 30 will output a power-fault signal indicative of such an abnormal condition in the power. In response to this power-fault signal, the power control circuit 60 will adjust the level of the power being supplied to the CPU 10 in a feedback control manner. This feedback control proceeds until the power being supplied to the CPU 10 is adjusted to within the tolerable range defined by the power-rating code from the CPU 10.

In the event that the feedback control is unable to bring the abnormal power level back to the tolerable power range defined by the power-rating code, the power-fault signal will trigger the alarm signal generator 40 to produce an alarm signal which is then converted by the loudspeaker 50 into an audible alarm sound to inform the user or any personnel nearby to take any necessary repair actions.

Second Preferred Embodiment

Figure 4:
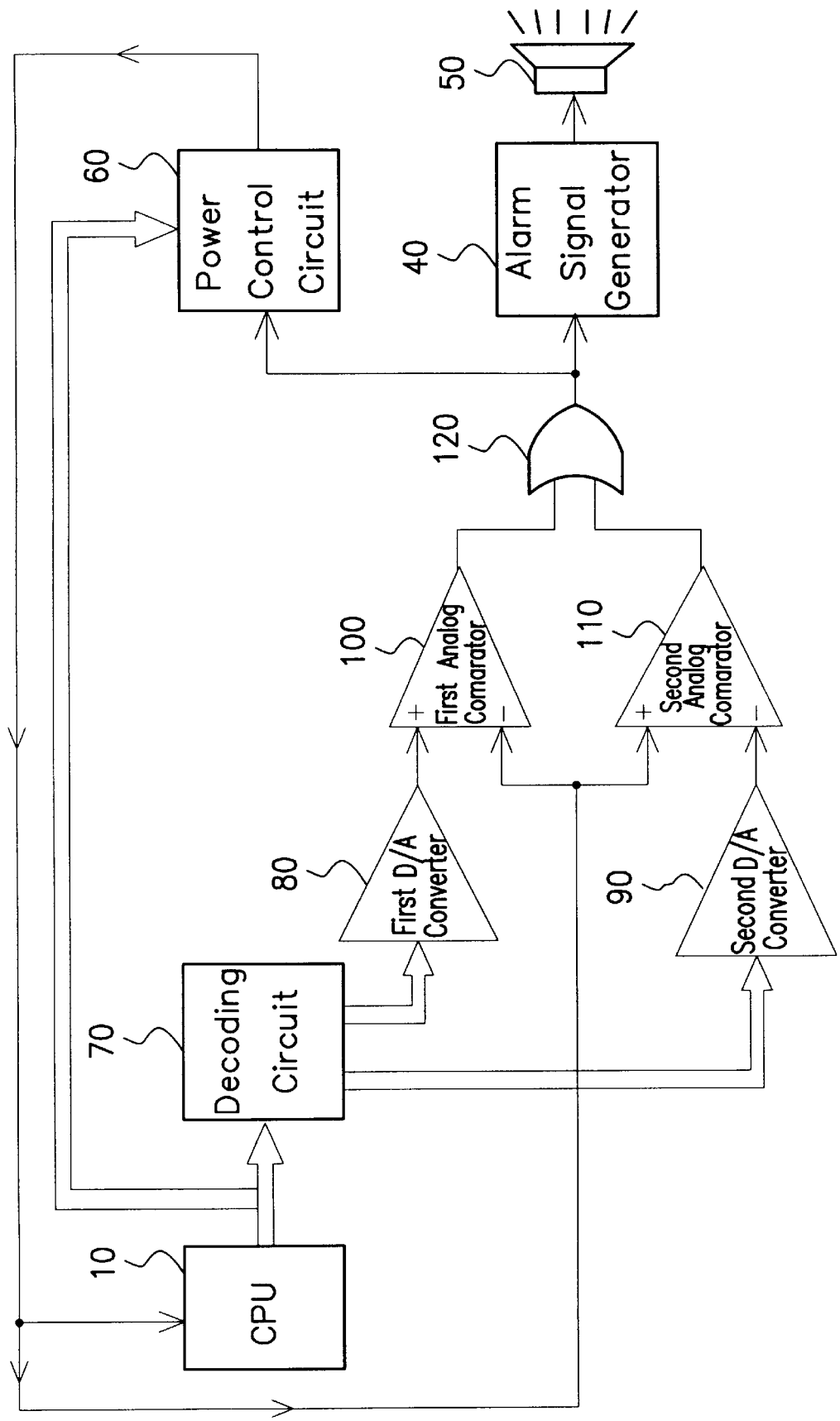
FIG. 4 is a schematic block diagram of a second preferred embodiment of the power monitoring circuit according to the invention for monitoring the power being supplied to a CPU.

FIG. 4 shows the second preferred embodiment of the power monitoring circuit according to the invention for monitoring the power being supplied to a CPU 10. In FIG. 4, the constituent elements of the second embodiment that are identical in function to those in the previous embodiment of FIG. 3 are labeled with the same reference numerals.

As shown in FIG. 4, the power monitoring circuit of this embodiment includes an alarm signal generator 40, a loudspeaker 50, a power control circuit 60, a decoding circuit 70, a first D/A converter 80, a second D/A converter 90, a first analog comparator 100, a second analog comparator 110, and an OR gate 120.

In operation, the CPU 10 sends out its factory-preset built-in power-rating code to both of the decoding circuit 70 and the power control circuit 60. In response to this power-rating code, the power control circuit 60 will output a corresponding power level to the CPU 10, while the decoding circuit 70 decodes the power-rating code into an upper-limit reference value and a bottom-limit reference value. These two reference values are in digital form. The bottom-limit reference value is first converted by the first D/A converter 80 into analog form and then sent to the positive input end of the first analog comparator 100; while the upper-limit reference value is first converted by the second D/A converter 90 into analog form and then sent to the negative input end of the second analog comparator 110. The negative input end of the first analog comparator 100 and the positive input end of the second analog comparator 110 are tied together and connected to the power input line of the CPU 10.

The power being supplied to the CPU 10 can be within three ranges: (1) within the tolerable power range defined by the power-rating code—normal condition; (2) below the bottom limit of the tolerable power range—abnormal condition; and (3) above the upper limit of the tolerable power range—abnormal condition.

When the power being supplied to the CPU 10 is within the tolerable power range defined by the power-rating code, the input to the (+) end of the first analog comparator 100 is smaller in magnitude than the input to the (−) end of the same, thus causing the first analog comparator 100 to output a low-voltage logic signal; and meanwhile, the input to the (+) end of the second analog comparator 110 is also smaller in magnitude than the input to the (−) end of the same, thus causing the second analog comparator 110 to output a low-voltage logic signal.

In the event that the power being supplied to the CPU 10 is below the bottom limit of the tolerable power range, the input to the (+) end of the first analog comparator 100 is greater in magnitude than the input to the (−) end of the same, thus causing the first analog comparator 100 to output a high-voltage logic signal; and meanwhile, the input to the (+) end of the second analog comparator 110 is smaller in magnitude than the input to the (−) end of the same, thus causing the second analog comparator 110 to output a low-voltage logic signal.

Further, in the event that the power being supplied to the CPU 10 is above the upper limit of the tolerable power range, the input to the (+) end of the first analog comparator 100 is smaller in magnitude than the input to the (−) end of the same, thus causing the first analog comparator 100 to output a low-voltage logic signal; and meanwhile, the input to the (+) end of the second analog comparator 110 is greater in magnitude than the input to the (−) end of the same, thus causing the second analog comparator 110 to output a high-voltage logic signal. The foregoing three cases can be summarized in the following table:

| Power Condition | Output of 1st analog comparator 100 | Output of 2nd analog comparator 110 | Output of OR gate 120 | Significance |
| --- | --- | --- | --- | --- |
| Within Tolerable Power Range | L | L | L | Normal |
| Below Bottom Limit | H | L | H | Abnormal |
| Above Upper Limit | L | H | H | Abnormal |

Therefore, when the output of the OR gate 120 is a low-voltage logic signal, it indicates that the power being currently supplied to the CPU 10 is within the tolerable range. In this case, no action is taken by the power control circuit 60. Whereas, when the output of the OR gate 120 is a high-voltage logic signal (referred to as a power-fault signal), it indicates that the power is beyond the tolerable range. In response to this high-voltage power-fault signal from the OR gate 120, the power control circuit 60 will adjust its output power to within the range defined by the power-rating code from the CPU 10. The adjusted power output is then fed back to the first and second analog comparators 100, 110 for feedback control. This feedback control continues until the output power from the power control circuit 60 to the CPU 10 is within the tolerable range defined by the power-rating code from the CPU 10.

If the high-voltage power-fault signal at the output of the OR gate 120 is continued for a predetermined period (which means that the feedback control is unable to bring the out-of-range power back within the tolerable range during this period), it will trigger the alarm signal generator 40 to generate an alarm signal which is then converted by the loudspeaker 50 into an audible alarm sound to notify the user or any personnel nearby to take necessary actions.

Two preferred embodiments of the invention are disclosed and described above. However, broadly speaking, the alarm signal generator 40, the loudspeaker 50, and the power control circuit 60 are not considered essential constituent elements of the invention and thus can be eliminated in various other embodiments. Moreover, various other alarm means can be used in place of the alarm signal generator 40 and loudspeaker 50. For a mother board that includes manual means for power adjustments, the power control circuit 60 can be eliminated, leaving the power-fault signal only used to trigger the generation of the alarm signal to notify the user of such a power-fault condition.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A power monitoring circuit for monitoring the power being supplied to a CPU having a factory-preset built-in power-rating code indicating a tolerable power range acceptable by the CPU, said power monitoring circuit comprising:

an A/D converter, coupled to receive the power being supplied to the CPU as input signal, for converting the input signal into a digital signal whose value indicates the current magnitude of the power being supplied to the CPU;

decoding means, coupled to receive the power-rating code from the CPU, for producing a bottom-limit reference value and an upper-limit reference value in digital form which indicate respectively the bottom and upper limits of the tolerable power range acceptable by the CPU; and comparator means, coupled to said decoding means and said A/D converter, for comparing the digital signal from said A/D converter with both the bottom-limit reference value and the upper-limit reference value received from said decoding means, said comparator means generating a power-fault signal if the value of the digital signal from said A/D converter is either greater than the upper-limit reference value or smaller than the bottom-limit reference value, indicating that the power being currently supplied to the CPU is beyond the tolerable power range defined by the power-rating code.

2. The power monitoring circuit of claim 1, further comprising:

audio alarm generating means, coupled to said comparator means, capable of generating an audible alarm sound in response to the power-fault signal from said comparator means.

3. The power monitoring circuit of claim 2, wherein said audio alarm generating means comprises a loudspeaker for producing the audible alarm sound.

4. The power monitoring circuit of claim 1, further comprising:

a power control circuit, coupled to the CPU and said comparator means, capable of adjusting the power being supplied to the CPU to within the tolerable power range defined by the power-rating code from the CPU in response to the power-fault signal from said comparator means.

5. The power monitoring circuit of claim 4, wherein the power-rating code represents the tolerable power range between an upper limit and a bottom limit that are acceptable by the CPU.

6. A power monitoring circuit for monitoring the power being supplied to a CPU having a factory-preset built-in power-rating code indicating a tolerable power range acceptable by the CPU, said power monitoring circuit comprising:

decoding means, coupled to receive the power-rating code from the CPU, for producing a bottom-limit reference value and an upper-limit reference value in digital form which indicate respectively the bottom and upper limits of the tolerable power range acceptable by the CPU; and a first D/A converter, coupled to said decoding means, for converting the bottom-limit reference value from said decoding means into analog form;

a second D/A converter, coupled to said decoding means, for converting the upper-limit reference value from said decoding means into analog form;

a first analog comparator having a positive input end coupled to receive the output of said first D/A converter and a negative input end coupled to receive the power being supplied to the CPU, for comparing the power being supplied to the CPU against the output of said first D/A converter which represents the bottom limit of the tolerable power range acceptable by the CPU, said first analog comparator generating a high-voltage logic signal if the power being supplied to the CPU is smaller in magnitude than the output of said first D/A converter, and a low-voltage logic signal otherwise;

a second analog comparator having a positive input end coupled to receive the power being supplied to the CPU and a negative input end coupled to receive the output of said second D/A converter, for comparing the power being supplied to the CPU against the output of said second D/A converter which represents the upper limit of the tolerable power range acceptable by the CPU, said second analog comparator generating a high-voltage logic signal if the power being supplied to the CPU is larger in magnitude than the output of said second D/A converter, and a low-voltage logic signal otherwise; and an OR gate for performing a logic-OR operation on the output of said first analog comparator and the output of said second analog comparator; said OR gate outputting a high-voltage logic signal serving as a power-fault signal when the output of either one of said first and second D/A converters is at a high-voltage state.

7. The power monitoring circuit of claim 6, further comprising:

audio alarm generating means, coupled to said comparator means, capable of generating an audible alarm sound in response to the power-fault signal from said comparator means.

8. The power monitoring circuit of claim 7, wherein said audio alarm generating means comprises a loudspeaker for producing the audible alarm sound.

9. The power monitoring circuit of claim 6, further comprising:

a power control circuit, coupled to the CPU and said OR gate, capable of adjusting the power being supplied to the CPU to within the tolerable power range defined by the power-rating code from the CPU in response to the power-fault signal from said OR gate.

10. The power monitoring circuit of claim 9, wherein the power-rating code represents the tolerable power range between an upper limit and a bottom limit that are acceptable by the CPU.

\* \* \* \* \*